(12) United States Patent
Tsai et al.

(10) Patent No.: US 8,767,196 B2
(45) Date of Patent: Jul. 1, 2014

(54) METHOD FOR MEASURING PROPAGATION LOSS IN A PLANE LIGHT GUIDE PLATE

(75) Inventors: Din Ping Tsai, Taiepi (TW);
Kuo-Cheng Huang, Hsinchu (TW);
Hung Ji Huang, Hsinchu (TW)

(73) Assignee: National Applied Research Laboratories

( * ) Notice: Subject to any disclaimer, the term of this patent is extended or adjusted under 35 U.S.C. 154(b) by 35 days.

(21) Appl. No.: 13/603,033

(22) Filed: Sep. 4, 2012

(65) Prior Publication Data

US 2014/0002811 A1 Jan. 2, 2014

(30) Foreign Application Priority Data

Jun. 29, 2012 (TW) .............................. 101123448 A (51) Int. Cl.
*G01N 21/00* (2006.01)

(52) U.S. Cl.
USPC ........................................................ 356/73.1

(58) Field of Classification Search
USPC ................. 356/213, 73.1, 402–425; 422/612;
398/9, 25, 28
See application file for complete search history.

(56) References Cited

U.S. PATENT DOCUMENTS

| | | | | |
|---|---|---|---|---|
| 3,777,149 A * | 12/1973 | Marcatili | .................... | 250/208.6 |
| 4,151,747 A * | 5/1979 | Gottlieb et al. | ................ | 374/161 |
| 4,317,631 A * | 3/1982 | Froscher et al. | ................. | 356/73 |
| 4,572,665 A * | 2/1986 | Benoit | .......................... | 356/73.1 |
| 5,357,334 A * | 10/1994 | Ishiguro et al. | ............... | 356/73.1 |
| 5,875,384 A | 2/1999 | Peill | | |
| 5,919,422 A | 7/1999 | Yamanaka et al. | | |
| 6,238,630 B1 | 5/2001 | Iimura | | |
| 7,023,533 B2 * | 4/2006 | Golowich et al. | ............. | 356/73.1 |
| 7,325,960 B2 | 2/2008 | Chiang et al. | | |
| 7,927,553 B2 | 4/2011 | Tsai et al. | | |
| 2005/0084228 A1 | 4/2005 | Lin et al. | | |
| 2008/0233008 A1* | 9/2008 | Sarkisov et al. | ........... | 422/82.05 |
| 2009/0316072 A1 | 12/2009 | Okumura | | |
| 2011/0069510 A1 | 3/2011 | Yamashita et al. | | |

OTHER PUBLICATIONS

John Downing "Light Sources and Photodetectors for OBS® Sensors" Apr. 2008.*

* cited by examiner

*Primary Examiner* — Gregory J Toatley
*Assistant Examiner* — Maurice Smith
(74) *Attorney, Agent, or Firm* — Wang Law Firm, Inc.; Li K. Wang; Stephen Hsu (57) ABSTRACT

A method for measuring propagation loss in a plane light guide plate, which includes the following steps of making an input light generated by an input light generator pass through an optical coupler, an optical reflection device individually or pass through the optical coupler first and then the optical reflection device, and finally propagate toward an optical measurement device to obtain at least one optical parameter according to the optical coupler, the optical reflection device or the combination thereof; and making the input light pass through the optical coupler and then the plane light guide plate, and further pass through the plane light guide plate from one side thereof toward the optical reflection device in order to reflect the input light toward the optical measurement device, so as to obtain a propagation loss of the plane light guide plate according to the at least one optical parameter.

10 Claims, 8 Drawing Sheets

METHOD FOR MEASURING PROPAGATION LOSS IN A PLANE LIGHT GUIDE PLATE

CROSS-REFERENCE TO RELATED APPLICATION

This application claims the benefit of Taiwan Patent Application No. 101123448, filed on Jun. 29, 2012, in the Taiwan Intellectual Property Office, the disclosure of which is incorporated herein in its entirety by reference.

BACKGROUND OF THE INVENTION

1. Field of the Invention

The present invention relates to a measurement method, and particularly a method for measuring propagation loss in a plane light guide plate.

2. Description of the Related Art

Optical plane light guide plates are of great importance to application of optical technology, especially of the field in opto-electronic display. Such issues are discussed in US Patent Publication No. 2005/0084228 A1, US Patent Publication No. 2009/0316072 A1、US Patent Publication No. 2011/0069510 A1 and U.S. Pat. No. 7,325,960 B2. Recently, optical plane light guide plates are used in chemical reactors of photocatalysts, as driving elements in the chemical reactors or in platforms for chemical reactions. Thus, coupling efficiency of and propagation loss inside the optical plane light guide plates is the key threshold of related technologies.

On the other hand, the problems of environmental pollution are getting much worse in recent years, and thus the removal of pollutants using methods of photocatalysts or photochemistry is potentially developmental and significantly meaningful. Generally, photocatalyst particles and reaction solution are mixed homogeneously during the processes of photocatalytic reduction reaction such that the photocatalyst suspending in the reaction solution can carry out photocatalytic reduction effectively. Such reaction systems of mixing the photocatalyst particles with the reaction solution take advantage of high efficiency of reaction. However, the photocatalysts are needed to be recycled from the reaction solution, and thus the complexity, time and costs of the processes increase. Additionally, it is still doubted how to make the photocatalyst have sufficient illuminated area in order to carry out photocatalytic reaction for mass production. In 1977, Marinangeli and Ollis proposed an idea of optical fiber photocatalytic reactor. For such reactors, $TiO_2$ photocatalyst is coated on the surface of the optical fiber, and the reactants are attached to the surface of $TiO_2$ film. The reaction light source propagates in the optical fiber such that the $TiO_2$ photocatalyst and input lights can perform the photocatalytic reduction. As described in U.S. Pat. Nos. 5,875,384, 5,919,422 and 6,238,630, the efficiency of the reactions of the light-guided photocatalytic reactors with small volumes is good, but the reactors are required to fix in reaction tanks resulting in lower efficiency of mass transfer of reactants.

Thus, TW Patent Application No. 096107772 and U.S. Pat. No. 7,927,553 both disclose a photocatalytic reactor with movable conformal light guiding plate to accelerate the processing of the photocatalytic reaction. In other aspect, plane light guide plates are used as a propagation interface for the light to induce or enhance the photochemical reactions in such reactors mentioned above, in order to eliminate the loss of absorption or scattering of the light used in the processes, and achieve the optimal design of photochemical reactors.

Accordingly, the present invention provides a method for measuring propagation loss in a plane light guide plate for applications of photoelectronic detection technologies as well as chemical engineering, environmental engineering and other green technologies, to solve the difficulties of prior arts and meet the demands.

SUMMARY OF THE INVENTION

In view of foregoing problems of the prior art, the purpose of the present invention is to provide a method for measuring propagation loss in a plane light guide plate. Such method for measuring propagation loss in a plane light guide plate can be applicable to a photocatalytic reactor, and the photocatalytic reactor can includes an input light generator, an optical coupler, a plane light guide plate, an optical reflection device and an optical measurement device.

A method for measuring propagation loss in a plane light guide plate in accordance with the present invention comprises steps of:

making an input light generated by the input light generator pass through the optical coupler, the optical reflection device individually or pass through the optical coupler first and then the optical reflection device, and finally propagate toward the optical measurement device in order to obtain at least one optical parameter according to the optical coupler, the optical reflection device or combination thereof.

making the input light pass through the optical coupler and then the plane light guide plate, and further pass through the plane light guide plate from one side thereof toward the optical reflection device in order to reflect the input light to the optical measurement device, so as to obtain a propagation loss of the plane light guide plate according to the at least one optical parameter.

Preferably, the method for measuring propagation loss in a plane light guide plate further comprises the steps of:

using the input light illuminate the optical measurement device directly without passing through any optical elements to obtain an initial parameter of the input light; and using the optical measurement device to obtain a propagation loss of the plane light guide plate according to the at least one optical parameter and the initial parameter.

Preferably, the at least one optical parameter comprises an optical coupler propagation loss, an optical reflection device propagation loss or the combination thereof.

Preferably, the photocatalytic reactor further comprises a rotating plane mirror, and the method for measuring propagation loss in the plane light guide plate further comprises a step of:

using the rotating plane mirror to reflect the input light to the optical reflection device.

Preferably, the input light generator is a gaseous light source, a semiconductor light source or a light source regulated by a corresponding optical element.

Preferably, the optical element comprises an optical transmission element, an optical reflection element or an optical transfer interface guide plate.

Preferably, the optical coupler is an optical transmission element or an optical reflection element.

Preferably, the plane light guide plate is made of an optical substrate material or a photochemical catalytic material.

Preferably, a shape of the plane light guide plate comprises a circle or a polygon with a center of symmetry.

Preferably, the optical reflection device is a cyclic metal ring, the cyclic metal ring has a cyclic metal reflection surface, such that the input light is substantially reflected from the cyclic metal reflection surface to the optical measurement device.

Preferably, the optical measurement device is a semiconductor measurement device, a photomultiplier tube measurement device or a spectrometer.

As mentioned above, the method for measuring propagation loss in a plane light guide plate in accordance with the present invention is of great importance to the photoelectric detection technology, as well as applications of chemical engineering, environmental engineering or other green technologies. The losses of the lights in different plane light guide plates can be measured directly by the method for measuring propagation loss in a plane light guide plate in accordance with the invention. Thus, the development of the applications of the plane light guide plate for photocatalysts or synergy of surface plasma is significantly accelerated and then the researches and the adding value thereof are improved.

DETAILED DESCRIPTION OF THE PREFERRED EMBODIMENTS

The present invention is more specifically described in the following paragraphs by reference to the drawings attached only by way of examples. For convenience of understanding the principles of the invention, the same elements/components having same functions or structures in any of the following examples are marked as the same numbers or symbols.

Figure 1:
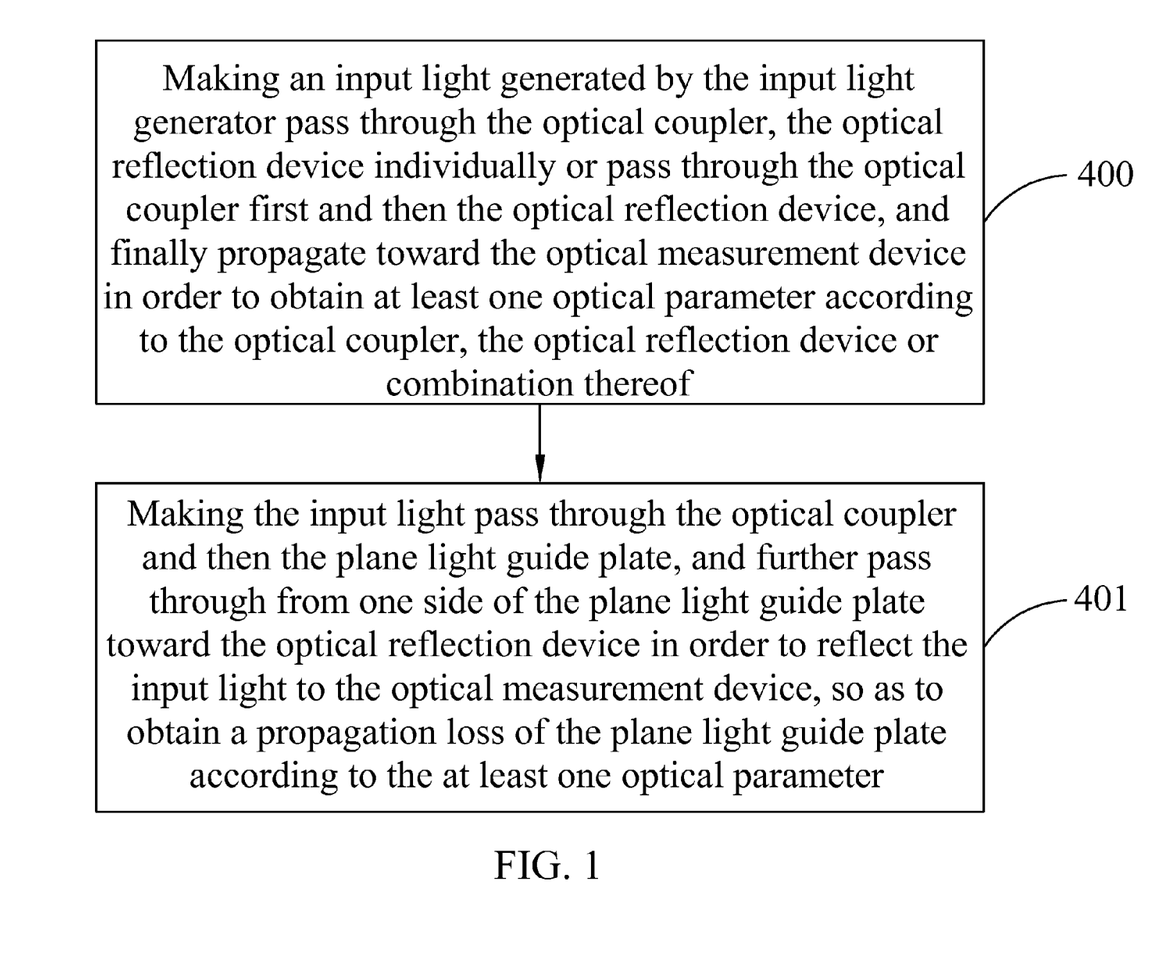
FIG. 1 is a flow diagram of a method for measuring propagation loss in a plane light guide plate in accordance with the present invention.

With reference to FIG. 1, it is a flow diagram of a method for measuring propagation loss in a plane light guide plate in accordance with the present invention. Such method for measuring propagation loss in a plane light guide plate can be used in a photocatalytic reactor, and the photocatalytic reactor can includes an input light generator, an optical coupler, a plane light guide plate, an optical reflection device and an optical measurement device. As shown in the figures, the method for measuring propagation loss in a plane light guide plate in accordance with the invention comprises steps of:

400: making an input light generated by the input light generator pass through the optical coupler, the optical reflection device individually or pass through the optical coupler first and then the optical reflection device, and finally propagate toward the optical measurement device in order to obtain at least one optical parameter according to the optical coupler, the optical reflection device or combination thereof.

401: making the input light pass through the optical coupler and then the plane light guide plate, and further pass through the plane light guide plate from one side thereof toward the optical reflection device in order to reflect the input light to the optical measurement device, so as to obtain a propagation loss of the plane light guide plate according to the at least one optical parameter.

In other words, the at least one optical parameter of the devices in the chemical reactor are measured by the method for measuring propagation loss in a plane light guide plate to obtain the propagation loss of the light during light transfer. Such method also can stabilize and simultaneously optimize the system operation of the photocatalytic reactor.

With reference to FIGS. 2 to 8, they are schematic diagrams of the method for measuring propagation loss in a plane light guide plate in accordance with the present invention.

Figure 2:
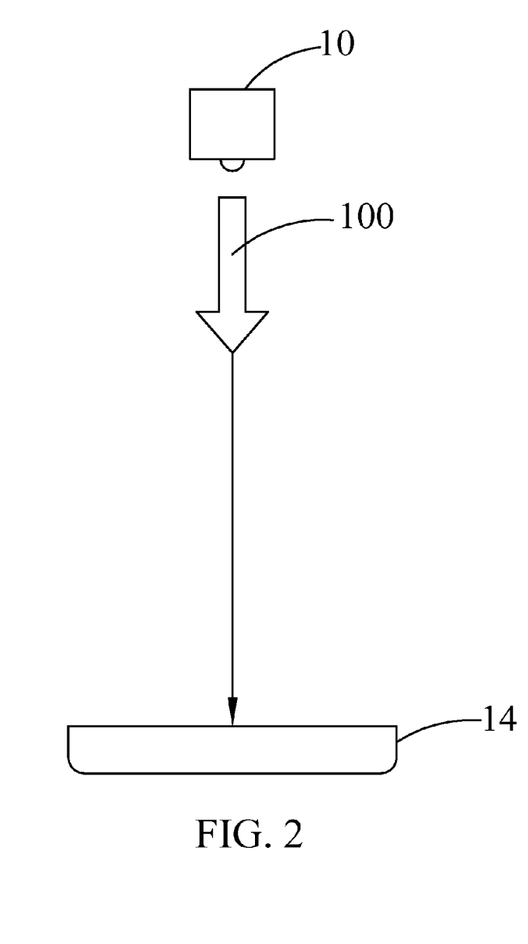
FIG. 2 is a first schematic diagram illustrated the operation of a method for measuring propagation loss in a plane light guide plate in accordance with the present invention.

As shown in FIG. 2, the input light 100 is generated by the input light generator 10 and illuminated on the optical measurement device 14 directly without passing through any optical elements. As such, an initial parameter of the input light 100, also regarded as a sum of initial light energy, can be obtained. In one aspect, the input light generator 10 can be a gaseous light source, a semiconductor light source or a light source regulated by corresponding optical element. Additionally, the optical element can be an optical transmission element, an optical reflection element or an optical transfer interface guide plate.

In one aspect, the propagation loss in a plane light guide plate is obtained according to the at least one optical parameter and the initial parameter. The at least one optical parameter can include an optical coupler propagation loss, an optical reflection device propagation loss or the combination thereof. For the convenience of description, the at least one optical parameter is represented as the amount of the propagation loss of the optical coupler and the amount of the propagation loss of the optical reflection device in the following examples.

It is noteworthy that a variety of optical measurement devices 14 are chosen depending on the optical properties of the input light 100, such optical measurement devices 14 include, but not limited to, a semiconductor measurement device, a photomultiplier tube measurement device, a spectrometer or other element or device used for conversing the light energy to numerical and recordable sum of light energy, directions of optical rotations, phases and polarization via serial procedures. For example, the spectrometer is used to know the distribution of the input light 100. Furthermore, a variety of optical measurement devices 14 such as, but not limited to, the devices mentioned above, can be used to obtain the at least one optical parameter of any one of the light source mentioned in following examples or the light source obtained by reflection, refraction or scattering of the input light 100 via any optical element.

Figure 3:
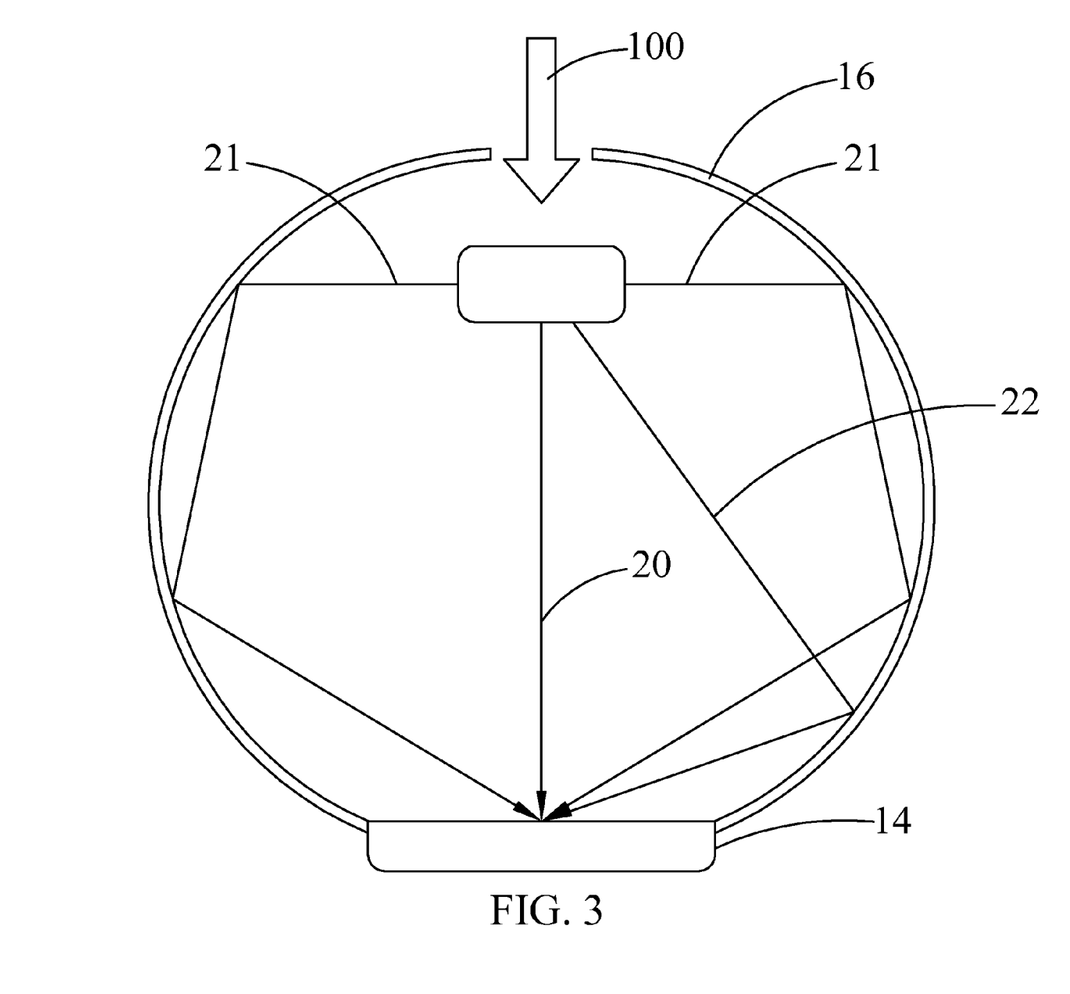
FIG. 3 is a second schematic diagram illustrated the operation of a method for measuring propagation loss in a plane light guide plate in accordance with the present invention.

As shown in FIG. 3, the input light generator 10 cam make the input light 100 pass through the optical coupler 11. The optical coupler penetrating light 20, optical coupler side-emitting light 21 and the random scattering light 22 of the optical coupler 11 occur since the optical coupler 11 cannot completely change the direction of the input light 100 passing through the optical coupler 11. However, the optical coupler 11 has a certain degree of propagation loss itself depending on the material or the structure thereof, and thus the intensity of total light energy of the optical coupler penetrating light 20, the optical coupler side-emitting light 21 and the random scattering light 22 produced by the input light 100 passing through the optical coupler 11 are measured by an optical integrating sphere 16 coordinated with the optical measurement device 14. Therefore, the propagation loss of the optical coupler 11 can be estimated by subtracting the intensity of total light energy of the optical coupler penetrating light 20, the optical coupler side-emitting light 21 and the random scattering light 22 from the sum of initial light energy of the input light 100. As such, the structure or the material of the optical coupler 11 can be determined and optimized by the method to reduce the propagation loss of the optical coupler 11. It is noteworthy that the optical coupler 11 can be optical transmission element or optical reflection element.

Figure 4:
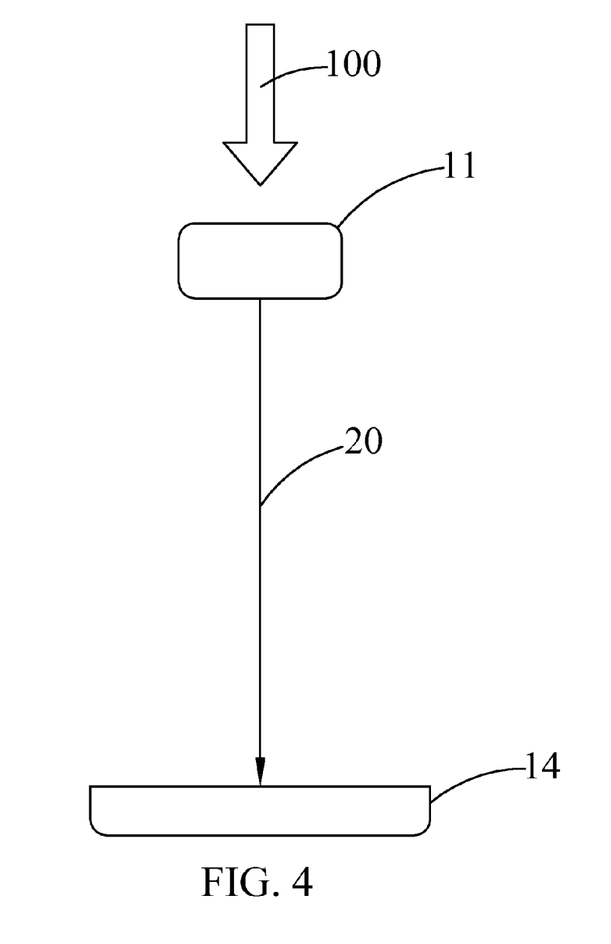
FIG. 4 is a third schematic diagram illustrated the operation of a method for measuring propagation loss in a plane light guide plate in accordance with the present invention.
Figure 5:
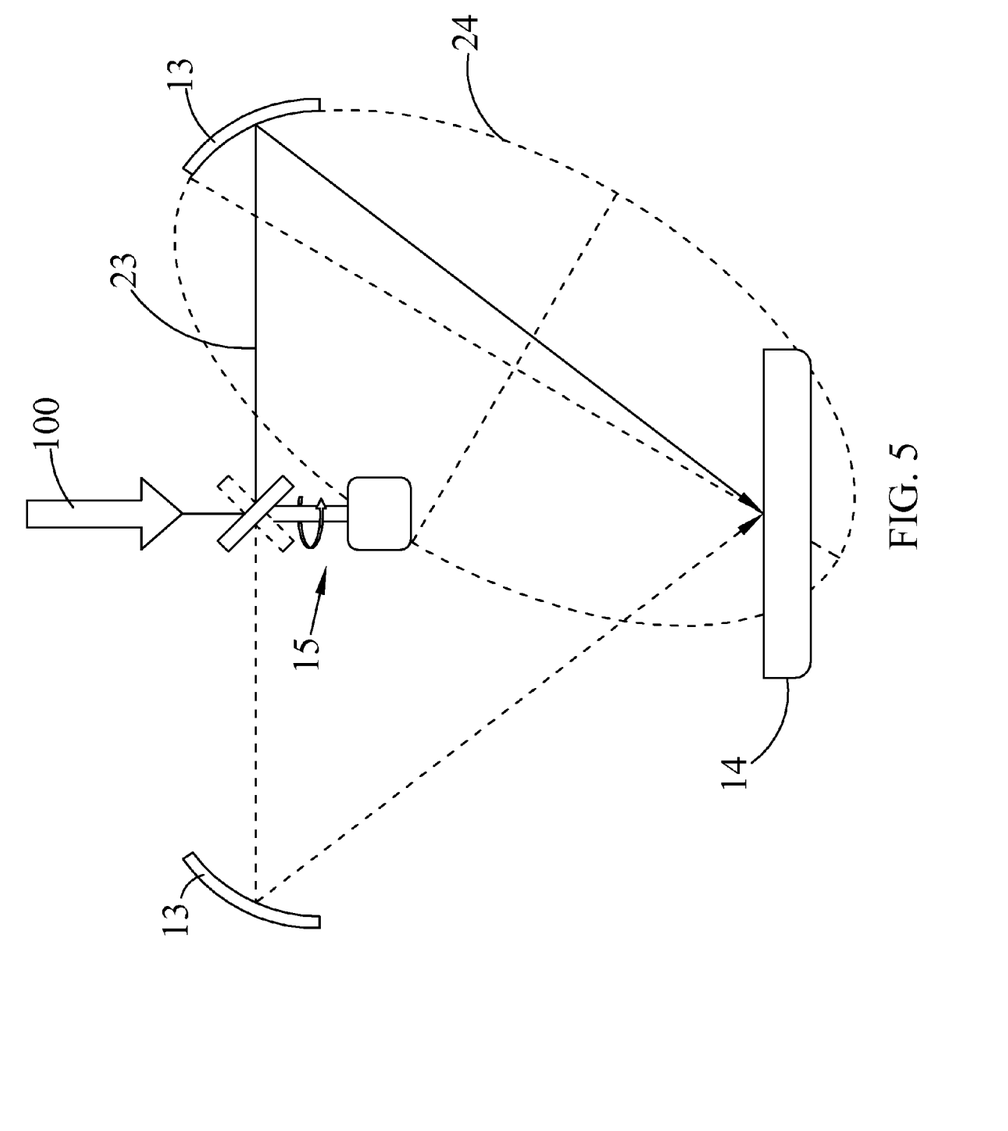
FIG. 5 is a forth schematic diagram illustrated the operation of a method for measuring propagation loss in a plane light guide plate in accordance with the present invention.
Figure 6:
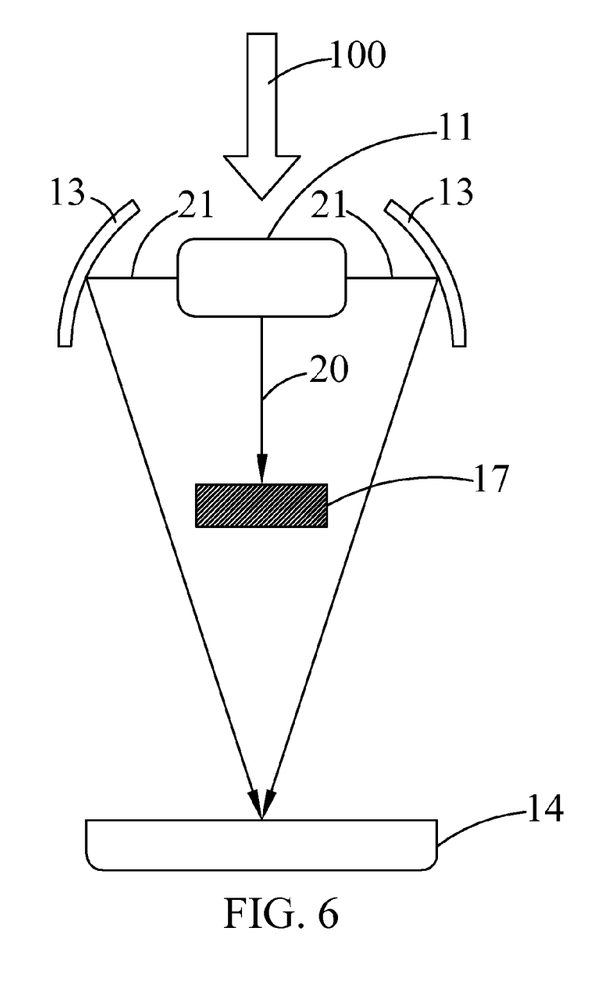
FIG. 6 is a fifth schematic diagram illustrated the operation of a method for measuring propagation loss in a plane light guide plate in accordance with the present invention.

With reference to FIGS. 4 to 6, the input light generator 10 can make the input light 100 pass through the optical coupler 11, and let the optical measurement device 14 only receive the optical coupler penetrating light 20 to measure the intensity of the optical coupler penetrating light 20 (as shown in FIG. 4). With reference to FIG. 5, the rotating plane mirror 15 with a known reflection index can also reflect the input light 100 generated by the input light generator 10. The rotating plane mirror 15 can be placed with an angle of 45 degrees. The direction of the input light 100 can be changed by the rotating plane mirror 15 to become a plane mirror reflecting light 23 and then illuminate the optical reflection device 13. The plane mirror reflecting light 23 is converged and reflected via the optical reflection device 13 to focus on the optical measurement device 14. Thus, in the embodiment, the sum of the light energy collected by the optical measurement device 14 minus the known amount of reflection loss of the rotating plane mirror 15 and the energy of the input light 100, and then the mount of the propagation loss of the optical reflection device 13 which is caused by making the input light 100 reflected by the optical reflection device 13 could be obtained.

Figure 8:
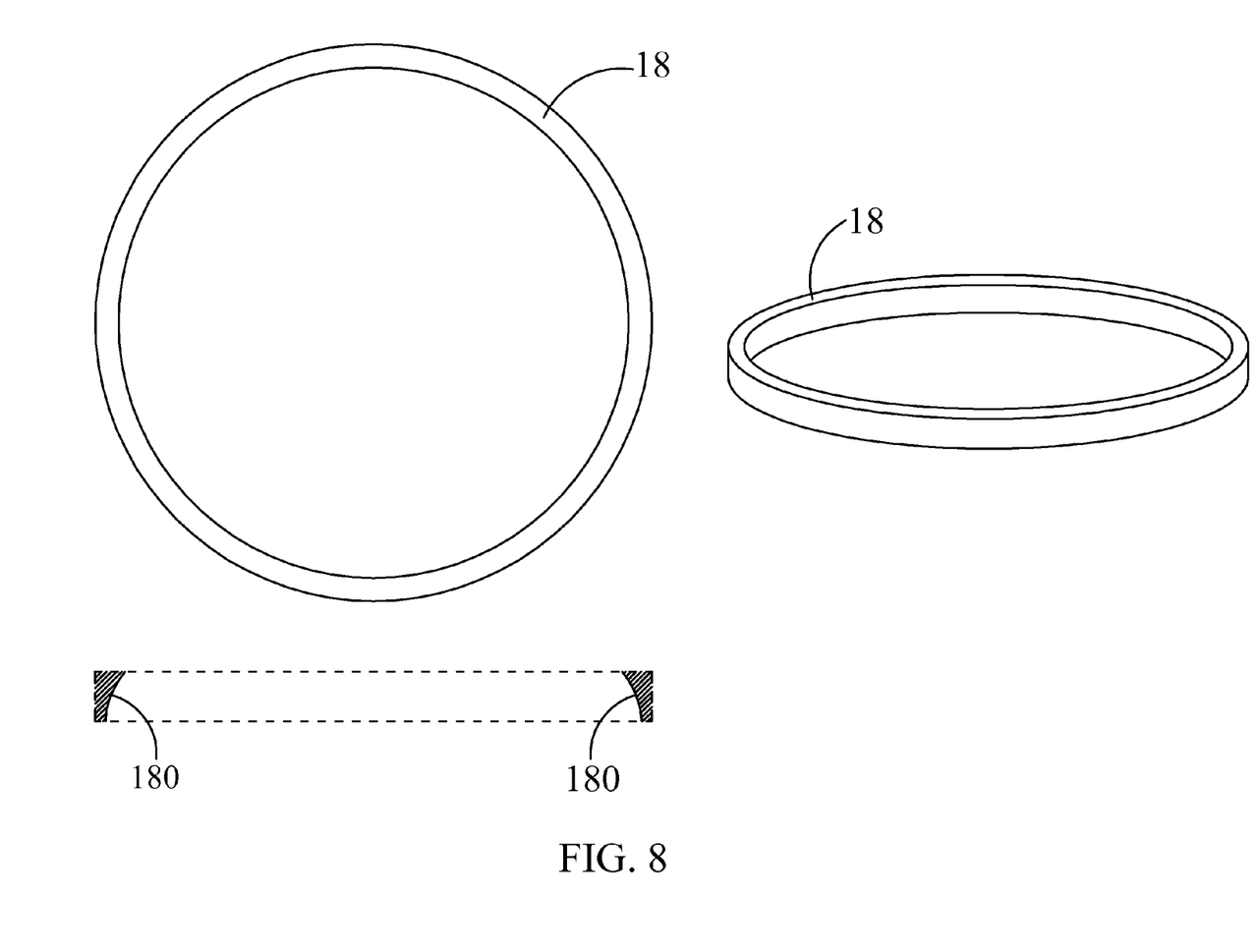
FIG. 8 is a seventh schematic diagram illustrated the operation of a method for measuring propagation loss in a plane light guide plate in accordance with the present invention.

It is noteworthy that the optical reflection device 13 can be, but not limited to, a cyclic metal ring 18. The cyclic metal ring 18 has a cyclic metal reflection surface 180 (as shown in FIG. 8), and the cyclic metal ring 18 is formed by a part of a virtual ellipse 24. The plane mirror reflection light 23 is arranged to pass through a first focal point of the virtual ellipse 24, and then reflect from the cyclic metal reflection surface 180 to a second focal point of the virtual ellipse 24. The optical measurement device 14 is arranged at the second focal point such that the reflecting light substantially reflects to the optical measurement device 14. Due to the reflection characteristics of the cyclic metal ring 18 cooperated with the rotating plane mirror 15 which is capable of self-rotating, the amount of the propagation loss of the optical reflection device 13 (cyclic metal ring 18) can be measured.

With reference to FIG. 6, the input light generator 10 can make the input light 100 pass through the optical coupler 11, and the direction of the input light 100 can be changed by the optical coupler 11 to produce the optical coupler side-emitting light 21 and the optical coupler penetrating light 20. It is noteworthy that a baffle 17 is further provided to block the optical coupler penetrating light 20 such that the optical coupler side-emitting light 21 can be reflected by the optical reflection device 13 and then converged onto the optical measurement device 14 to obtain the intensity of the light energy which is produced by reflecting the optical coupler side-emitting light 21 via the optical reflection device 13.

Figure 7:
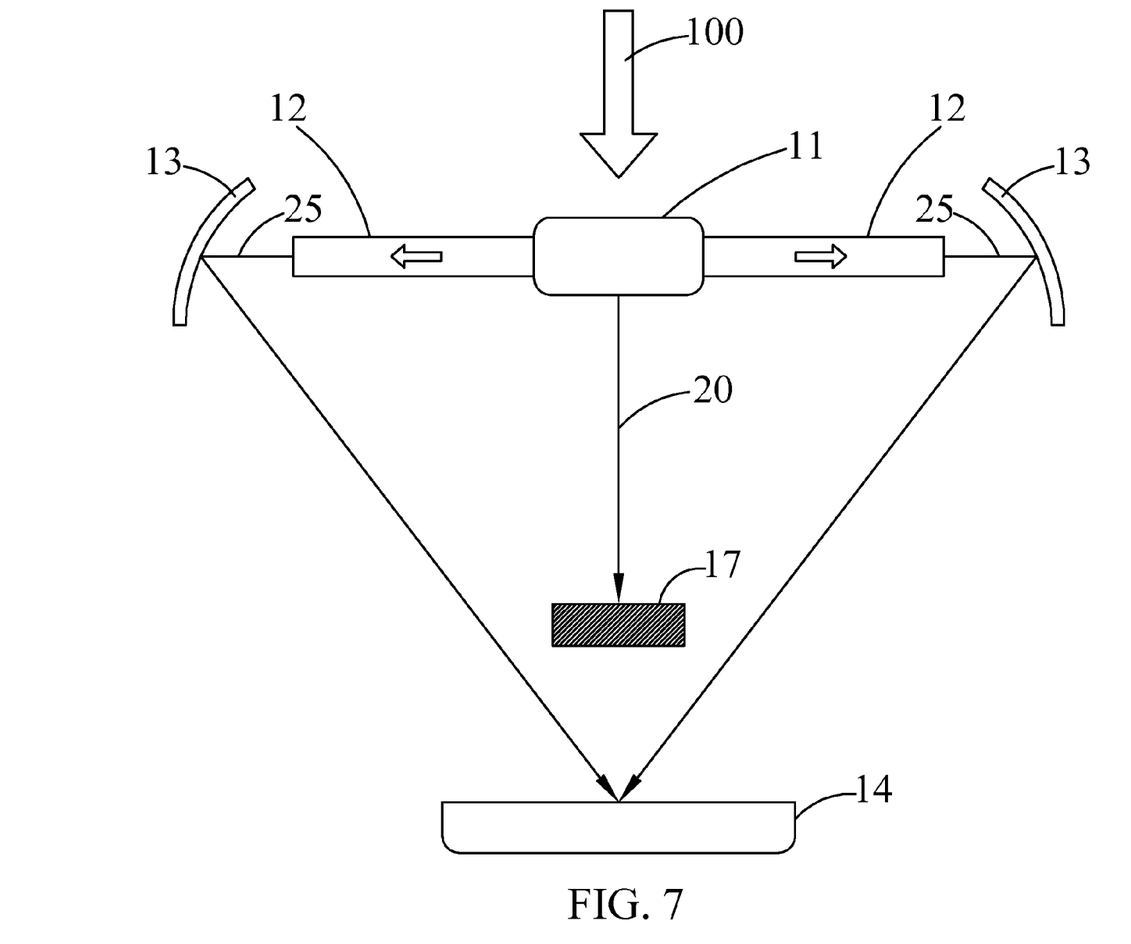
FIG. 7 is a sixth schematic diagram illustrated the operation of a method for measuring propagation loss in a plane light guide plate in accordance with the present invention.

With reference to FIG. 7, the input light generator 10 can make the input light 100 pass through the optical coupler 11. The direction of the input light 100 can be changed by the optical coupler 11 in order to get into the plane light guide plate 12, and then the input light 100 carries out the light propagation in the plane light guide plate 12. The optical coupler penetrating light 20 is blocked by the baffle 17 from getting in to the optical measurement device 14. The light propagating in the plane light guide plate 12 propagates toward an edge of the plane light guide plate 12 and then outputs an output light 25 exporting out of the plane light guide plate 12. The output light 25 could be reflected by the optical reflection device 13 and then converged onto the optical measurement device 14 in order to measure the intensity of the light energy which is produced by reflecting the output light 25 via the optical reflection device 13.

It is noteworthy that the angle of the output light 25 exporting out of the edge of the plane light guide plate 12 is relative to the thickness of the plane light guide plate 12. The thicker the plane light guide plate 12, the smaller the angle of the output light 25 exporting out of the edge of the plane light guide plate 12; otherwise, the thinner the plane light guide plate 12, the larger the angle of the output light 25 exporting out of the edge of the plane light guide plate 12. In one aspect, the plane light guide plate 12 can be an optical substrate material or a photochemical catalytic material. The shape of the plane light guide plate 12 can be a circle or a polygon with a center of symmetry.

In one aspect, the amount of the propagation loss in the plane light guide plate 12 can be estimated by knowing the energy of the input light 100, the amount of the propagation loss of the optical coupler 11, the amount of the propagation loss of the optical reflection device 13 and the intensity of the light energy of the output light 25. That is, the losses of the lights in different plane light guide plates can be measured directly by the method for measuring propagation loss in a plane light guide plate in accordance with the invention. Such method can be used as a fast and convenient measurement mechanism for plane light guide plates from sources and is beneficial to the optimal design and the applications of different plane light guide plate.

Additionally, the optical element used in the method for measuring propagation loss of a plane light guide plate in accordance the invention can be modified appropriately or added to other necessary components/devices to regulate light paths in order to collect the light energy completely. Thus, the other necessary components/devices not mentioned above should not limit the scope of the claims of the invention.

In a preferred embodiment, the photochemical catalytic material may optionally be coated on the plane light guide used in the method for measuring propagation loss in the plane light guide plate in accordance with the present invention, depending on the desired extent of application. Thus, the absorbance of the light energy or the loss of the scattering cause by the input light getting into the plane light guide plate are depending on the substances of the plane light guide plate and the photochemical catalytic material.

The following examples of the invention further describe and illustrate the preferred embodiment of the invention.

The example of the invention is the results simulated by the optical values of the method for measuring propagation loss in a round plane light guide plate. The simulation of the optical values can verify that an input light of an LED light source can be coupled by the optical coupler (ex: secondary optical structure) and get toward the center of the plane light guide plate, and then the coupled light must diverge from the center of the plane light guide plate to the edge of the same and then export.

The process of the operation of the invention is described as below:

An input light was optically coupled by the optical coupler. Then, the coupled input light propagated in a plane light guide plate. The coupled input light exported out of from the edge of the plane light guide plate and formed in an output light toward the optical reflection device (ex: a cyclic metal ring) when propagating to the edge of the plane light guide plate. The optical reflection device made the output light converges on a focal point of an eclipse surface of the cyclic metal ring. In the example, the input light was a commercial high-power white LED (3 watts, 250 lumens of light output) with 5 mm of diameter. The plane light guide plate was a round plane light guide plate with 0.5 mm of thickness made by polyethylene. The round plane light guide plate had a through hole with 15 mm of diameter at the center. The cyclic metal reflection surface of the cyclic metal ring had a long axis with 98.4 mm of diameter and a short axis with 50 mm of diameter, as well as the distance between two focal points with 84.8 mm. The angle of inclination of the long axis was 45 degrees. The height of the section of the cyclic metal reflection surface was 12 mm. It was assumed that there was a photocatalyst film with 30% of absorption rate of reflection disposed on the round plane light guide plate. By the calculation of the numerical simulation software, Apilux optical software, the output light can converge on the focal point of the elliptic reflection surface of the cyclic metal ring.

The input light produced by the LED light source calculated by software was optically coupled by the optical light coupler. A light with 112 lumens of total brightness can be changed to a light getting into the round plate light guide plate. An output light exporting out of the edge of the plane light guide plate was measured to be 46 lumens. That is, there were 66 lumens of total amount of the propagating light in the round plane light guide plate absorbed by the photocatalyst film. Since the absorption rate of the propagation rate inside the plane light guide plate is relative to the absorption rate of the reflection of the photocatalyst film when the input light propagating in the round plane light guide plate, the absorption rate of the reflection of the photocatalyst film estimated and obtained from the 66 lumens of the amount of the absorption of the propagating light was 30%.

According to the description above, the method for measuring propagation loss in a plane light guide plate of the present invention is of great importance to the photoelectric detection technology. The method of the present invention can not only used for the detection of varieties of plane light guide plates in the application of technical fields of photocatalysts, surface photochemistry or surface plasma but also for providing many required information about relative researches of photoelectronics. Thus, the development and research in the field of photoelectronic industries are significantly accelerated and then the adding value thereof is improved.

What is claimed is:

1. A method for measuring propagation loss in a plane light guide plate applicable to a photocatalytic reactor, the photocatalytic reactor having an input light generator, an optical coupler, a plane light guide plate, an optical reflection device and an optical measurement device, the method comprising steps of:

making an input light generated by the input light generator pass through the optical coupler, the optical reflection device individually, or pass through the optical coupler first and then the optical reflection device, and finally propagate toward the optical measurement device in order to obtain at least one optical parameter according to the optical coupler, the optical reflection device or combination thereof; and making the input light pass through the optical coupler and then the plane light guide plate, and further pass through the plane light guide plate from one side thereof toward the optical reflection device in order to reflect the input light to the optical measurement device, so as to obtain a propagation loss of the plane light guide plate according to the at least one optical parameter;

wherein the optical reflection device is a cyclic metal ring, the cyclic metal ring includes a cyclic metal reflection surface such that the input light is substantially reflected from the cyclic metal reflection surface to the optical measurement device.

2. The method of claim 1, further comprising the steps of:

using the input light to illuminate the optical measurement device directly without passing through any optical elements to obtain an initial parameter of the input light; and using the optical measurement device to obtain the propagation loss of the plane light guide plate according to the at least one optical parameter and the initial parameter.

3. The method of claim 1, wherein the at least one optical parameter comprises an optical coupler propagation loss, an optical reflection device propagation loss or the combination thereof.

4. The method of claim 3, the photocatalytic reactor comprising a rotating plane mirror, further comprising a step of:

using the rotating plane mirror to reflect the input light to and to characterize the optical reflection device.

5. The method of claim 1, wherein the input light generator is a gaseous light source, a semiconductor light source or a light source regulated by a corresponding optical element.

6. The method of claim 5, wherein the optical element comprises an optical transmission element, an optical reflection element or an optical transfer interface guide plate.

7. The method of claim 1, wherein the optical coupler is an optical transmission element or an optical reflection element.

8. The method of claim 1, wherein the plane light guide plate is made of an optical substrate material or a photochemical catalytic material.

9. The method of claim 8, wherein a shape of the plane light guide plate comprises a circle or a polygon with a center of symmetry.

10. The method of claim 1, wherein the optical measurement device is a semiconductor measurement device, a photomultiplier tube measurement device or a spectrometer.

* * * * *